Aug. 7, 1956 — J. R. WALGREN — 2,757,794
EXTRUSION EQUIPMENT
Filed March 5, 1953 — 2 Sheets-Sheet 1

INVENTOR.
John R. Walgren
BY
S. Ernest Low
ATTORNEY

Aug. 7, 1956    J. R. WALGREN    2,757,794
EXTRUSION EQUIPMENT
Filed March 5, 1953    2 Sheets-Sheet 2
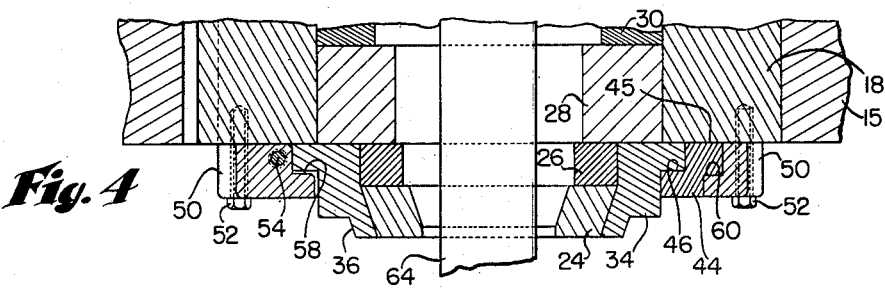
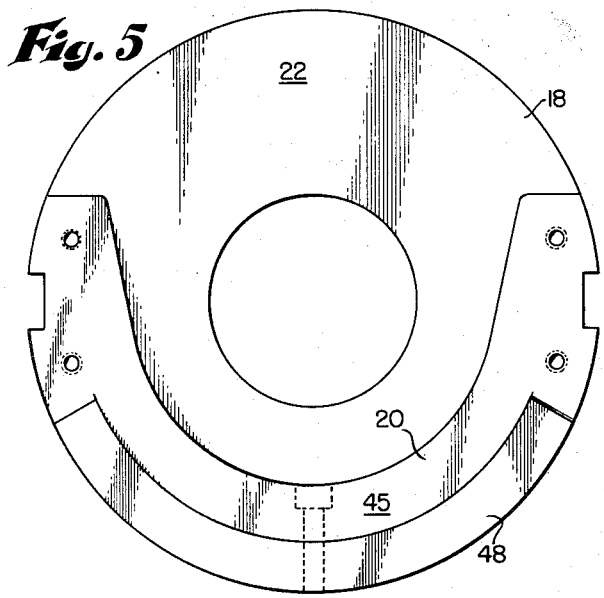
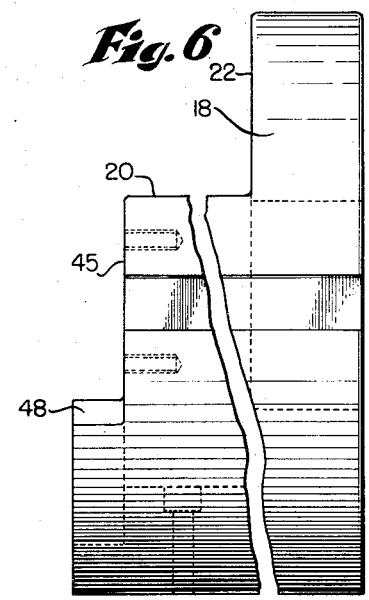
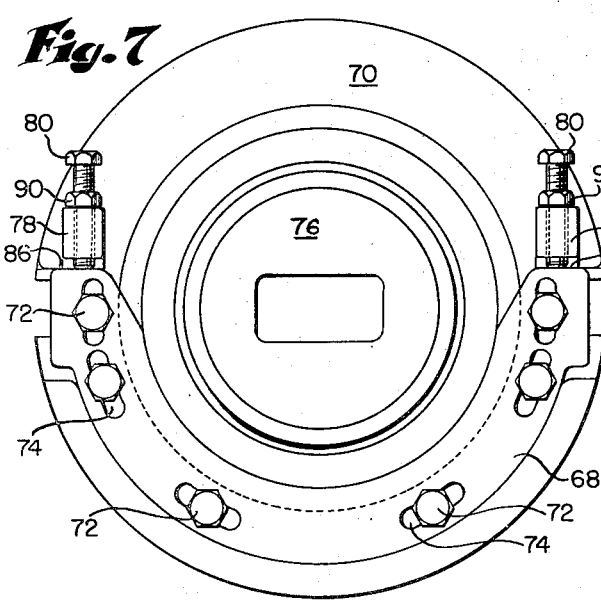
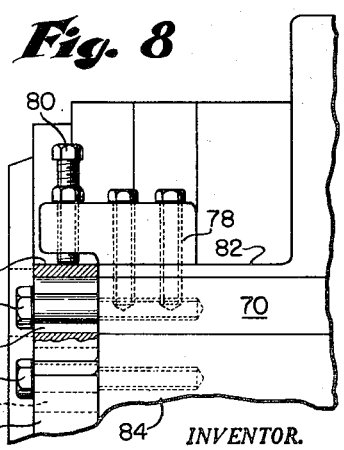
INVENTOR.
John R. Walgren
BY
S. Ernest Low
ATTORNEY

United States Patent Office 2,757,794
Patented Aug. 7, 1956

2,757,794

EXTRUSION EQUIPMENT

John R. Walgren, Pittsburgh, Pa., assignor to Aluminum Company of America, Pittsburgh, Pa., a corporation of Pennsylvania Application March 5, 1953, Serial No. 340,633

4 Claims. (Cl. 207—3)

This invention relates in general to horizontal material-working equipment and has particular reference to extrusion die and tool assemblies employed in the production of extruded tubular products.

It is an object of the invention to provide extrusion equipment in which the female extrusion die is adjustably mounted in respect to an extrusion mandrel or core in co-operative assembly therewith.

Another object of the invention is to provide a female extrusion die assembly and core arrangement in which the die assembly is rotatably adjustable into correct registration with its co-operating core.

Other objects and advantages of the invention will be understood from a consideration of the following specification and drawings, in which:

Fig. 4 illustrates a cross-sectional view taken on the stepped plane IV—IV of Fig. 2;

Fig. 5 illustrates a front elevational view of the tool container of Figs. 1, 2 and 4 sans tools;

Fig. 6 illustrates a side elevational view of the tool container of Fig. 5;

Fig. 7 illustrates a front elevational view similar to that of Fig. 2 but disclosing a modified form of the invention; and Fig. 8 illustrates a fragmentary side elevational view in partial section of the tool container assembly of Fig. 7.

Figure 1:
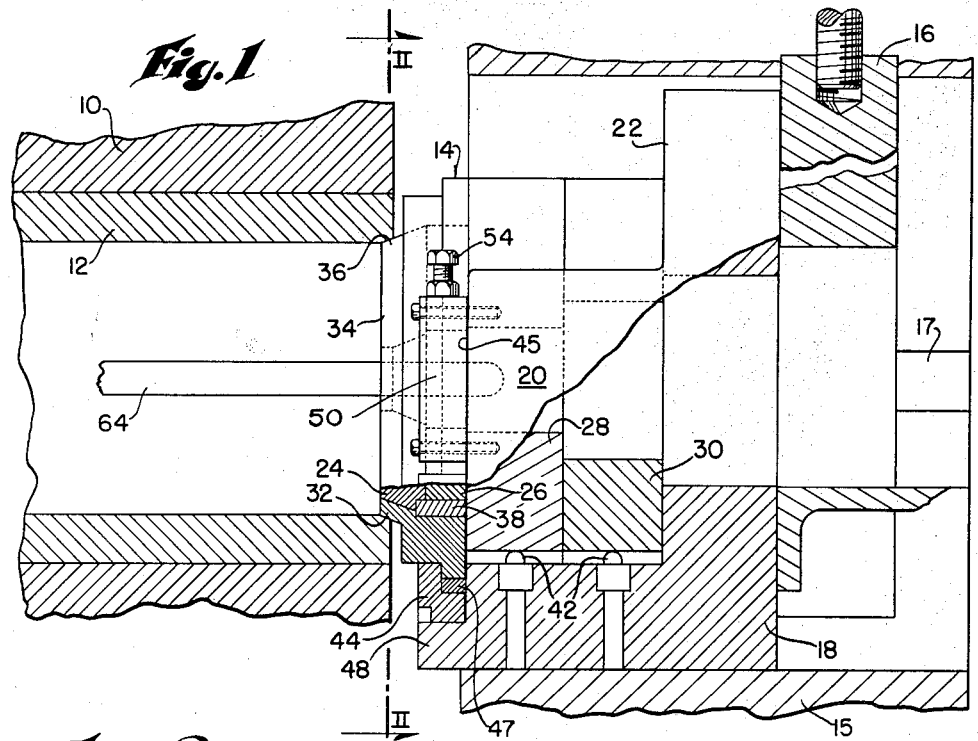
Fig. 1 illustrates a partial medial sectional elevation through an extrusion die assembly and its complementary extrusion container and core.
Figure 2:
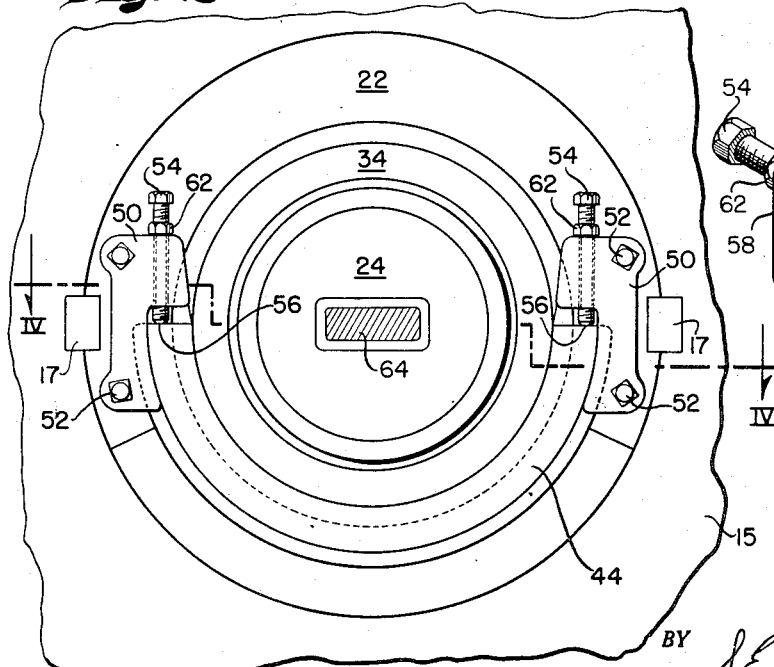
Fig. 2 illustrates a front elevational view of the tool container assembly taken in the direction of the arrows II—II of Fig. 1.
Figure 3:
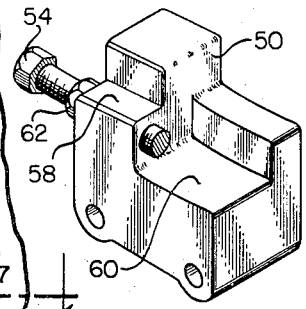
Fig. 3 illustrates a perspective view to enlarged scale of a clamping element of the invention.

The cross-section or configuration of a tubular extrusion is governed by an exterior contour-controlling female die in co-operation with a core or mandrel projecting therethrough and between which a die orifice is formed which is the exact configuration of the cross-section to be extruded in indeterminate lengths. In the extrusion of pipe and tubing of uniform circular cross-section no problem of any material consequence is presented in regard to peripheral or circumferential registration of the core with the bearing surface or land of the extrusion die. This, however, is not the case with tubular extrusions having other than round or circular cross-sections, in which latter case the cross-sectional boundaries or surfaces of the core or mandrel must maintain a fixed position in respect to and in registry with the cross-sectional enclosing surfaces of the complementary female extrusion die aperture. Non-registry of the core and female die in the latter case would result in the production of non-acceptable tubular material.

In general terms, the present invention provides a female extrusion die tool set-up or assembly which is rotatably adjustable in respect to its co-operating core, whereby the female extrusion die is capable of rotation, in respect to its rotationally fixed core, into correct registry of the core and die aperture to insure production of tubular extrusions of desired cross-sectional shape or configuration.

Referring now to Figs. 1 through 6, 10 represents an extrusion container into which material to be extruded is charged. The extrusion container 10 is preferably provided with a replaceable liner 12 and is capable of assembly in abutting pressure-resisting relationship with an extrusion die assembly represented in its entirety at 14. A suitable ram (not shown) is adapted to exert pressure on the material to be extruded from the container 10.

The tool assembly 14 is normally slidably received within a cavity or tubular housing in the front platen 15 of the extrusion apparatus and is locked therein by means of a reciprocable locking plate 16, as is well known in the art. Keys 17 serve to align the tool container 18 within the front platen.

The tool assembly comprises a tool container 18 (Figs. 5 and 6) constructed in the form of a substantially semi-circular forward trough portion 20 and integral rear annulus 22 against which pressure plate 16 abuts. The open top semi-circular trough portion 20 of the tool container 18 provides entrance into the same from the top thereof for the purpose of assembling the female extrusion die 24 and back-up members or annuli 26, 28 and 30 therein.

Although the die 24 may seal directly on a chamfered surface 32 on the liner 12, the female die and at least its next adjacent filler or back-up annulus 26 are preferably received within a tool ring 34 which in turn is provided with a chamfered surface 36 adjacent the entrance to liner 12 (Fig. 1).

The female die 24 and its back-up annulus 26 are held in registry within the tool ring 34 through the medium of a key 38. Filler or back-up annuli 28 and 30 are also preferably held in axial registry within the tool container 18 through the medium of keys 42.

A substantially semi-circular tool-retaining member or ring 44 is provided adjacent the front face 45 of the tool container 18. Member 44 is provided with an inwardly turned marginal flange in engagement with a stepped surface 46 on the tool ring 34 and is exteriorly supported on an arcuate ledge 48 extending forwardly from the front face 45 of the tool container 18. The retaining member 44 is also keyed at 47 to the annulus 34 supporting the female die 24.

Clamping and tool adjusting members or brackets 50 are secured, as by cap screws 52, to the front face 45 of the tool container 18. Members 50 support threaded bolt members 54 which project downwardly into end engagement with upper ledges or surfaces 56 (Fig. 2) of the semi-circular tool-retaining ring 44. The clamping members 50 are rabbeted at 58 and 60 to provide stepped surfaces or ledges overlying front plane surfaces of the tool ring 34 and semi-circular retaining ring 44, respectively. On reference to Fig. 4 it will be observed that the rabbet 58 provides clearance for the underlying flange of tool ring 34, whereas the rabbet 60 clamps against the front plane underlying surface of the semi-circular retaining ring 44.

It will be observed from the embodiment of the invention thus far described, and illustrated in Figs. 1 through 6, that manipulation of the bolts 54, one upwardly and the other downwardly, will serve to rotatably adjust the semi-circular retaining ring 44. Through its keyed connection to die ring 34, which in turn is key-connected to female die 24 and back-up annulus 26, rotational adjustment of the member 44 will likewise rotatably adjust the female die 24. Lock nuts 62 serve to lock or secure the bolts 54 following adjustment of the die 24 into proper registry with a core or mandrel 64 co-operatively associated with the die, the mandrel 64 being suitably secured against rotational movement about its longitudinal axis, as by rigid attachment to the ram (not shown) operating within the container 10.

A modified form of the extrusion equipment of the invention for performing rotatable adjustment of a female extrusion die in respect to its co-operating rotationally fixed core or mandrel is illustrated in Figs. 7 and 8. The mechanism is substantially the same as that previously described except for the particualr mounting of the adjustment screws or bolts and semi-circular tool-retaining ring.

In the embodiment of the invention illustrated in Figs. 7 and 8, a substantially semi-circular tool-retaining ring 68 is positively secured to the front face of a tool container 70 by means of a series of shouldered bolts 72 extending through slotted apertures 74 in the semi-circular ring 68 and into threaded engagement with the tool container 70. The semi-circular tool-retaining ring 68 otherwise overlies the tool assembly within the tool container in the same manner described for Figs. 1 through 6, the female die 76 having been selected as the full equivalent of die 24.

Brackets 78 support bolt members 80 in threaded engagement therewith, the brackets being secured to the upper ledges or surfaces 82 of the forward open trough-shaped portion 84 of the tool container 70. The bolts 80 extend downwardly through the brackets into lower end engagement with the upper ledge surfaces 86 of the semi-circular retaining ring 68 in a manner similar to that described for adjustment bolts 54 of Figs. 1, 2 and 3.

In the operation of this embodiment of the invention, it is only necessary to manipulate adjusting screws 80, one upwardly and the other downwardly, to rotatably shift the semi-circular tool-retaining ring 68 in the same manner as described for the semi-circular tool-retaining ring 44 of the first described form of the invention. In this connection, the shoulder portions of bolts 72 (Fig. 8) are selected in length slightly longer than the thickness of the semi-circular retaining ring 68 to permit free movement thereof, and its associated female die assembly, in response to the adjustment of screws 80. Following adjustment and registry of the tools in Figs. 7 and 8, the adjusting screws 80 are locked by means of the lock nuts 90 to maintain the tools in adjusted and clamped relationship within the tool container 70.

It will be apparent from the illustrations and description of the two embodiments of extrusion equipment above referred to that a female extrusion die assembly has been provided which can be brought into correct registry of its female die with a core or mandrel associated therewith in a plane normal to the axis of the core with a minimum number of mechanical instrumentalities incorporated in an otherwise well-known extrusion die assembly of the general type illustrated in John B. Jones United States Letters Patent 2,221,299, issued November 12, 1940.

Having described the invention in terms of two specific forms of equipment, it is to be understood that it is not to be limited to the exact types of apparatus selected for purposes of illustrating the invention, except as defined in the appended claims.

What is claimed is:

1. In a horizontal material-working apparatus comprising a core fixed against rotational movement and a female die co-operating with said core to provide an other than circular extrusion die orifice therebetween, said die orifice lying in a plane normal to the axis of the core, an adjustable female tool assembly comprising a circular tool ring surrounding and keyed to the female die, a semi-circular tool-retaining ring key-connected to the tool ring and overlying an adjacent plane surface thereof, said semi-circular tool-retaining ring being supported on its exterior surface upon a ledge projecting outwardly from a tool container carrying the female die and holding the tool ring and its supported female die against said tool container, said exterior surface on the tool ring and supporting projecting ledge on the tool container presenting true cylindrical complementary surfaces of a radius having its center of revolution coincident with the true center of the die orifice, and a pair of adjusting screws carried by said tool container in end engagement with the semi-circular tool-retaining ring on diametrically opposite sides of the axis through the true center of the die orifice, said screws being oppositely movable to rotatably shift the semi-circular tool-retaining ring, tool ring and female die as a unit in the plane normal to the core axis in respect to the tool container and core about the true center of the die orifice.

2. In a horizontal material-working apparatus including a female die and core extending into the female die to form a die orifice therewith, said die orifice lying in a vertical plane normal to the axis of the core, a tool container for supporting the female die in substantial registry with the core and providing a semi-circular arcuate ledge projecting away from the plane of the die orifice below the horizontal axis of the core and die orifice, a tool-retaining ring having a complementary semi-circular surface supported on the semi-circular arcuate ledge, said tool-retaining ring having positive connection with the female die, a pair of adjusting members carried by the tool container and engageable with the tool-retaining ring, said adjusting members being operable to relatively and rotatably shift the tool-retaining ring over the complementary arcuate surface of the projecting ledge to bring the tool-retaining ring and positively connected female die into precise registry with the core in the vertical plane normal to the axis of the core, and locking means associated with the adjusting members for maintaining the precise registration.

3. In a horizontal material-working apparatus including a female die and core extending into the female die to form a die orifice therewith, said die orifice lying in a vertical plane normal to the axis of the core, a tool container for supporting the female die in substantial registry with the core and providing a semi-circular arcuate ledge projecting away from the plane of the die orifice below the horizontal axis of the core and die orifice, a circular tool ring surrounding and keyed to said female die, a semi-circular tool-retaining ring having a complementary semi-circular surface supported on the semi-circular arcuate ledge, said semi-circular tool-retaining ring being positively connected to the circular tool ring, a bracket member secured to the tool container on each side and above the horizontal axis of the core and die orifice and in overlying clearance relationship with the semi-circular tool-retaining ring, an adjusting screw in each bracket in engagement with the semi-circular tool-retaining ring, manipulation of the screws in opposite direction serving to rotatably shift the semi-circular tool-retaining ring, circular tool ring and female die as a unit over the complementary arcuate surface of the projecting ledge supporting the semi-circular tool-retaining ring into precise registry of the core and die orifice in the vertical plane normal to the axis of the core, and locking means on the screws for maintaining the precise registration.

4. In a horizontal material-working apparatus comprising a female die and a core fixed against rotational movement extending into the female die to form a die orifice therewith, said die orifice lying in a vertical plane normal to the axis of the core, a tool container for supporting the female die in horizontal alignment with the core axis and otherwise substantial registry with the core, a ledge projecting away from the die orifice and providing a semi-circular arcuate surface below the horizontal axis of the core and die orifice, a semi-circular tool-retaining ring having a complementary semi-circular external surface supported on the semi-circular surface of the projecting ledge, said semi-circular tool-retaining ring having positive connection with the female die and overlying clearance relationship with a front surface of the tool container surrounding and adjacent the female die, individual bracket members secured to the tool container one on each side of and above the horizontal axis of the core and die orifice and in overlying clearance relationship with the semi-circular tool-retaining ring, an adjusting screw carried in each bracket with its end in engagement with the semi-circular tool-retaining ring, manipulation of the screws in opposite direction being effective to rotatably shift the semi-circular tool-retaining ring and positively connected die as a unit over the semi-circular arcuate surface of the projecting ledge to bring the female die into precise registry with the core in the vertical plane normal to the axis of the core, and locking means on the screws for maintaining the precise registration.

References Cited in the file of this patent

UNITED STATES PATENTS

| | | |
|---|---|---|
| 641,041 | Royle | Jan. 9, 1900 |
| 2,164,397 | Ganoe | July 4, 1939 |
| 2,172,867 | Dreyer | Sept. 12, 1939 |
| 2,221,299 | Jones | Nov. 12, 1940 |
| 2,530,669 | Thornton et al. | Nov. 21, 1950 |
| 2,602,539 | See | July 8, 1952 |

FOREIGN PATENTS

| | | |
|---|---|---|
| 14,670 | Great Britain | 1903 |
| 166,915 | Great Britain | July 14, 1921 |